United States Patent
Zhu

(10) Patent No.: US 12,207,343 B2
(45) Date of Patent: Jan. 21, 2025

(54) METHOD AND APPARATUS FOR ACQUIRING LOCATION INFORMATION, DEVICE, AND STORAGE MEDIUM

(71) Applicant: ZTE CORPORATION, Shenzhen (CN)

(72) Inventor: Yuna Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/788,689

(22) PCT Filed: Dec. 22, 2020

(86) PCT No.: PCT/CN2020/138264
§ 371 (c)(1),
(2) Date: Jun. 23, 2022

(87) PCT Pub. No.: WO2021/129603
PCT Pub. Date: Jul. 1, 2021

(65) Prior Publication Data
US 2023/0041047 A1 Feb. 9, 2023

(30) Foreign Application Priority Data
Dec. 23, 2019 (CN) .......................... 201911340111.6

(51) Int. Cl.
*H04W 8/04* (2009.01)
*H04L 61/4588* (2022.01)
(Continued)

(52) U.S. Cl.
CPC ............... *H04W 8/04* (2013.01); *H04W 8/12* (2013.01); *H04W 60/04* (2013.01); *H04L 61/4588* (2022.05)

(58) Field of Classification Search
CPC ......... H04W 8/04; H04W 8/12; H04W 60/04; H04W 4/025; H04L 61/4588
See application file for complete search history.

(56) References Cited

U.S. PATENT DOCUMENTS

| 2015/0181550 A1* | 6/2015 | Ward ..................... H04W 4/029 455/456.1 |
| 2018/0255421 A1* | 9/2018 | Hua ........................ H04W 4/14 |

(Continued)

FOREIGN PATENT DOCUMENTS

| CN | 108574596 A | 9/2018 |
| CN | 109756896 A | 5/2019 |

(Continued)

OTHER PUBLICATIONS

China Mobile, "Update on authentication aspect of solution #3", SA WG2 Meeting #133 S2-1905483, May 17, 2018 (May 17, 2018), entire document.

(Continued)

*Primary Examiner* — Nishant Divecha
(74) *Attorney, Agent, or Firm* — Morgan, Lewis & Bockius LLP

(57) ABSTRACT

Provided are a method for acquiring location information and an apparatus for acquiring location information, a device and a storage medium. The method includes: receiving answer data sent by a home subscriber server (HSS), where the answer data carries a hostname of a mobility management entity (MME); determining, on the basis of the hostname of the MME, a network actually registered for a user; and in a case where the network actually registered for the user is a 5G network, acquiring location information of the user in the 5G network.

9 Claims, 4 Drawing Sheets

Acquire a second location-service-acknowledgement message sent by the access and mobility management function (AMF), where the second location-service-acknowledgement message carries location information parameter of a user in a 5G network — S51

Map the location information parameter of the user in the 5G network to a location information parameter of the user in a 4G network — S52

Send a second insert-data-answer (IDA) message to a home subscriber server (HSS), where the second IDA message carries the location information parameter of the user in the 4G network — S53

(51) Int. Cl.
    *H04W 8/12*     (2009.01)
    *H04W 60/04*    (2009.01)

(56) References Cited

U.S. PATENT DOCUMENTS

| | | | |
|---|---|---|---|
| 2018/0332431 A1 | 11/2018 | Saily et al. | |
| 2019/0053010 A1 | 2/2019 | Edge et al. | |
| 2019/0166523 A1* | 5/2019 | Shaw | H04W 76/16 |
| 2019/0373401 A1* | 12/2019 | Jahangir | H04W 80/10 |
| 2020/0092776 A1* | 3/2020 | Edge | H04W 8/08 |
| 2020/0204962 A1* | 6/2020 | Hua | H04W 48/18 |
| 2020/0245127 A1* | 7/2020 | Zong | H04W 36/0022 |
| 2021/0014759 A1* | 1/2021 | Zhu | H04L 69/24 |
| 2022/0166878 A1* | 5/2022 | Xia | H04M 3/42348 |

FOREIGN PATENT DOCUMENTS

| | | |
|---|---|---|
| CN | 109818816 A | 5/2019 |
| CN | 109996311 A | 7/2019 |
| EP | 3577998 A1 | 12/2019 |
| WO | WO-2019157953 A1 | 8/2019 |
| WO | WO-2019196602 A1 | 10/2019 |

OTHER PUBLICATIONS

International Search Report for Application No. PCT/CN2020/138264, dated Mar. 23, 2021, 4 pages including English translation.
Indian Office Action for Application No. 202227038668 dated Oct. 10, 2022, 5 pages.
Office Action in Chinese Application No. 201911340111.6, dated Jul. 2, 2024, 12 pages including translation.
Search Report in Chinese Application No. 201911340111.6, dated Jul. 1, 2024, 6 pages including translation.
Supplementary Partial European Search Report for U.S. Appl. No. 20/907,046 dated Jan. 17, 2024, 15 pages.
"3rd Generation Partnership Project; Technical Specification Group Services and System Aspects; User data interworking, coexistence and migration (Release 16)", 3GPP Standard; Technical Report; 3GPP TR 23.973, 3rd Generation Partnership Project (3GPP), Mobile Competence Centre ; 650, Route Des Lucioles ; F-06921 Sophia-Antipolis Cedex ; France No. V16.0.0, Aug. 19, 2019 (Aug. 19, 2019), pp. 1-29.

* cited by examiner

METHOD AND APPARATUS FOR ACQUIRING LOCATION INFORMATION, DEVICE, AND STORAGE MEDIUM

CROSS-REFERENCE TO RELATED APPLICATION(S)

This is a national stage application filed under 37 U.S.C. 371 based on International Patent Application No. PCT/CN2020/138264, filed Dec. 22, 2020, which claims the priority to Chinese Patent Application No. 201911340111.6 filed with the Chinese Intellectual Property Administration (CNIPA) on Dec. 23, 2019, the disclosures of both of which are incorporated herein by reference in their entireties.

TECHNICAL FIELD

The present disclosure relates to the field of location technologies in 5G, for example, to a method for acquiring location information and an apparatus for acquiring location information, a device and a storage medium.

BACKGROUND

When a user in the 4th generation mobile communication technology (4G) network accesses the 5th generation mobile communication technology (5G) network, only location information of the user in 4G network can be queried by the application server (AS) network element, the gateway mobile location center (GMLC) network element and the home subscriber server (HSS) network element, but location information of the user in 5G network cannot be queried, which causes that the AS network element or the GMLC network element cannot obtain the location information of the user in 5G network.

SUMMARY

A method for acquiring location information and an apparatus for acquiring location information, a device and a storage medium are provided according to the present disclosure.

A method for acquiring location information is provided, the method is applied to a first network element, and the method includes:
  receiving answer data sent by a home subscriber server (HSS), where the answer data carries a hostname of a mobility management entity (MME);
  determining, on the basis of the hostname of the MME, a network actually registered for a user; and
  in a case where the network actually registered for the user is a 5G network, acquiring location information of the user in the 5G network.

A method for acquiring location information is further provided, the method is applied to an interworking function (IWF), and the method includes:
  acquiring a second location-service-acknowledgement message sent by an access and mobility management function (AMF), where the second location-service-acknowledgement message carries a location information parameter of a user in a 5G network;
  mapping the location information parameter of the user in the 5G network to a location information parameter of the user in a 4G network; and
  sending a second insert-data-answer (IDA) message to a home subscriber server (HSS), where the second IDA message carries the location information parameter of the user in the 4G network.

An apparatus for acquiring location information is further provided, the apparatus for acquiring location information is configured in the first network element, and the apparatus for acquiring location information includes: a receiving module, a determining module and an acquiring module.

The receiving module is configured to receive answer data sent by a home subscriber server (HSS), where the answer data carries a hostname of a mobility management entity (MME);

The determining module is configured to determine, on the basis of the hostname of the MME, a network actually registered for a user; and The acquiring module is configured to acquire, in a case where the network actually registered for the user is a 5G network, location information of the user in the 5G network.

An apparatus for acquiring location information is further provided, the apparatus for acquiring location information is configured in an interworking function (IWF), and the apparatus for acquiring location information includes: an acquiring module, a mapping module and a sending module.

The acquiring module is configured to acquire a second location-service-acknowledgement message sent by an access and mobility management function (AMF), where the second location-service-acknowledgement message carries a location information parameter of a user in a 5G network;

The mapping module is configured to map the location information parameter of the user in the 5G network to a location information parameter of the user in a 4G network; and The sending module is configured to send a second insert-data-answer (IDA) message to a home subscriber server (HSS), where the second IDA message carries the location information parameter of the user in the 4G network.

A device is further provided, which includes: one or more processors, and a memory configured to store one or more programs, where the one or more programs, when executed by the one or more processors, cause the one or more processors to implement any one of the methods for acquiring location information in the embodiments of the present disclosure.

A storage medium is further provided, where the storage medium stores a computer program, and the computer program, when being executed by a processor, implements any one of the methods for acquiring location information in the embodiments of the present disclosure.

With regard to the above embodiments and other aspects of the present disclosure, as well as implementations thereof, further explanation is provided in the brief description of the drawings, and the detailed description.

DETAILED DESCRIPTION

The embodiments of the present disclosure are described with reference to the drawings hereinafter. It is to be noted that, the embodiments in the present disclosure and the features in the embodiments may be arbitrarily combined with each other if there is no conflict.

The operations shown in the flowcharts of the drawings may be in the form of a set of computer-executable instructions to be executed in a computer system. Also, although a logical order is shown in the flowcharts, in some cases the operations shown or described may be performed in an order different from that herein.

Service platforms in the mobile network need to provide certain specified services according to an actual location of a user. There are mainly two types of the above service platforms: AS or GMLC.

Figure 1:
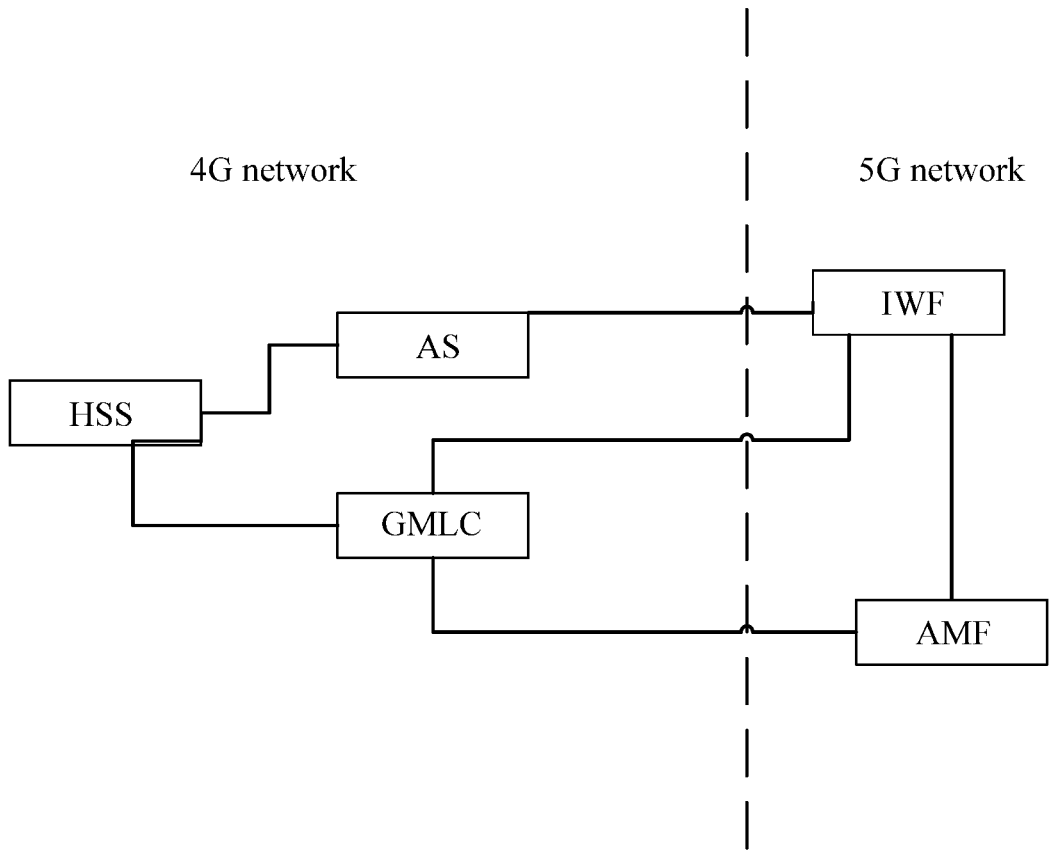
FIG. 1 is a networking diagram of a 4G network and a 5G network.

FIG. 1 is a networking diagram of a 4G network and a 5G network. As shown in FIG. 1, AS or GMLC is a platform that uses a 4G network, interworking function (IWF) and access and mobility management function (AMF) are function entities in the 5G system. Since the user is a user subscribed in 4G network, correspondingly, an HSS of the user subscribed in 4G network is also using the 4G network for communication.

When the user subscribed in 4G network accesses a 4G network, a GMLC queries an MME address currently registered for the user from an HSS, an MME queries location information of the user in the 4G network and returns it to the HSS, and the HSS forwards the location information of the user in the 4G network to the GMLC.

When the user subscribed in 4G network accesses a 5G standalone (SA) network, an AS queries location information of the user in the 5G network from the HSS. As the AS and the HSS only support query of location information in the 4G network, but does not support query of location information in the 5G network, the AS cannot acquire location information of the user in the 5G network.

When the user subscribed in 4G network accesses the 5G SA network, due to that GMLC and HSS only support query of location information in the 4G network, GMLC cannot acquire location information of the user in the 5G network.

Figure 2:
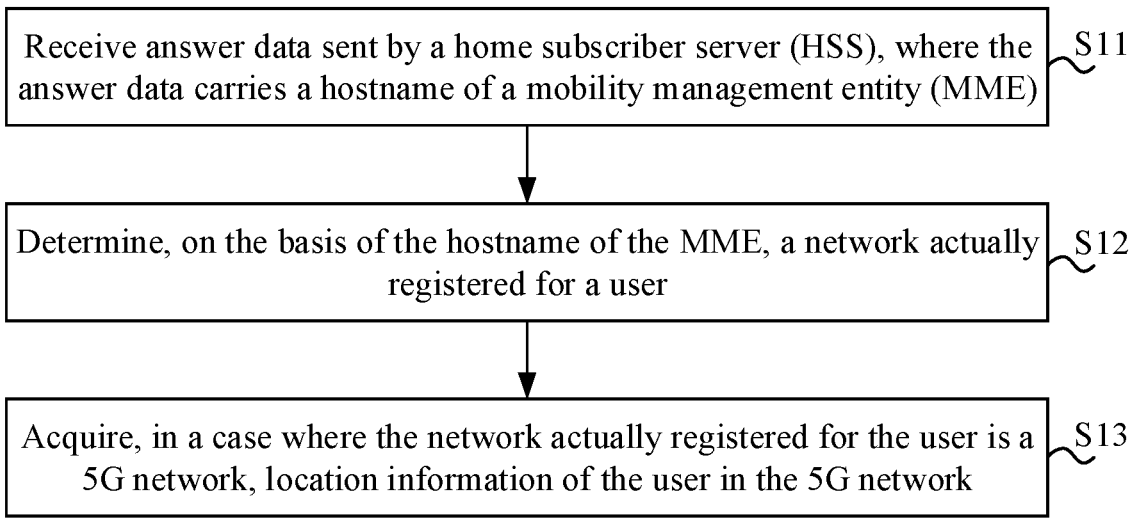
FIG. 2 is a schematic flowchart of a method for acquiring location information according to an embodiment of the present disclosure.

FIG. 2 is a schematic flowchart of a method for acquiring location information according to an embodiment of the present disclosure. This method can be applied to a case of acquiring, in a case where a user subscribed in 4G network accesses the 5G SA network, location information of the user in the 5G network. The method may be executed by an apparatus for acquiring location information according to the present disclosure, and the apparatus for acquiring location information can be implemented by software and/or hardware.

As shown in FIG. 2, the method for acquiring location information according to an embodiment of the present disclosure mainly includes operations in S11, S12 and S13.

Operation in S11 may include receiving answer data sent by a home subscriber server (HSS), where the answer data carries a hostname of a mobility management entity (MME).

Operation in S12 may include determining, on the basis of the hostname of the MME, a network actually registered for a user.

Operation in S13 may include acquiring, in a case where the network actually registered for the user is a 5G network, location information of the user in the 5G network.

In an exemplary embodiment, the determining, on the basis of the hostname of the MME, a network actually registered for a user includes: determining that the network actually registered for the user is a 5G network in a case where the hostname of the MME is the same as a pre-configured hostname of the IWF and other location information parameters except for the hostname of the MME in the answer data are empty.

In an exemplary embodiment, in a case where the first network element is an application server (AS), the receiving answer data sent by a home subscriber server (HSS) includes: receiving a first user-data-answer (UDA) message sent by the HSS, where the first UDA message carries the hostname of the MME.

In an embodiment, before the receiving a first user-data-answer (UDA) message sent by the home subscriber server (HSS), the method further includes: sending a first user-data-request (UDR) message to the HSS, where the first UDR message is used to instruct the HSS to send a first insert-data-request (IDR) message to an interworking function (IWF), where the first IDR message is used to request location information from the IWF and instruct the IWF to send a first insert-data-answer (IDA) message to the HSS, the first IDA message carries the hostname of the MME and empty location information.

In an embodiment, in a case where the first network element is an application server (AS), the acquiring location information of the user in the 5G network includes: sending a second UDR message to the IWF, where the second UDR message is used to instruct the IWF to send a first location-service-request message to an access and mobility management function (AMF), where the first location-service-request message is used to instruct the AMF to query location information of the user in the 5G network and instruct the AMF to send a first location-service-acknowledgement message to the IWF, where the first location-service-acknowledgement message carries the location information of the user in the 5G network; and receiving a second UDA message sent by the IWF, where the second UDA message carries the location information of the user in the 5G network.

In an exemplary embodiment, in a case where the first network element is a gateway mobile location center (GMLC), the receiving answer data sent by a home subscriber server (HSS) includes: receiving a location-service routing-information-answer (RIA) message sent by the HSS.

In an embodiment, before receiving the location-service routing-information-answer (MA) message sent by the HSS, the method further includes: sending a location-service routing-information-request (RIR) message to the HSS, where the RIR message is used to instruct the HSS to query location-service routing information and instruct the HSS to send the RIA message to the GMLC, where the RIA message carries the location-service routing information, and the location-service routing information includes the hostname of the MME.

In one embodiment, in a case where the first network element is a gateway mobile location center (GMLC), the acquiring location information of the user in the 5G network includes: sending a location-positioning-request message to an AMF through a service interface, where the location-positioning-request message is used to instruct the AMF to query location information of the user in the 5G network and instruct the AMF to send a location-positioning-acknowledgement message to the GMLC; and receiving a location-positioning-acknowledgement message sent by the AMF, where the location-positioning-acknowledgement message carries the location information of the user in the 5G network.

Figure 3:
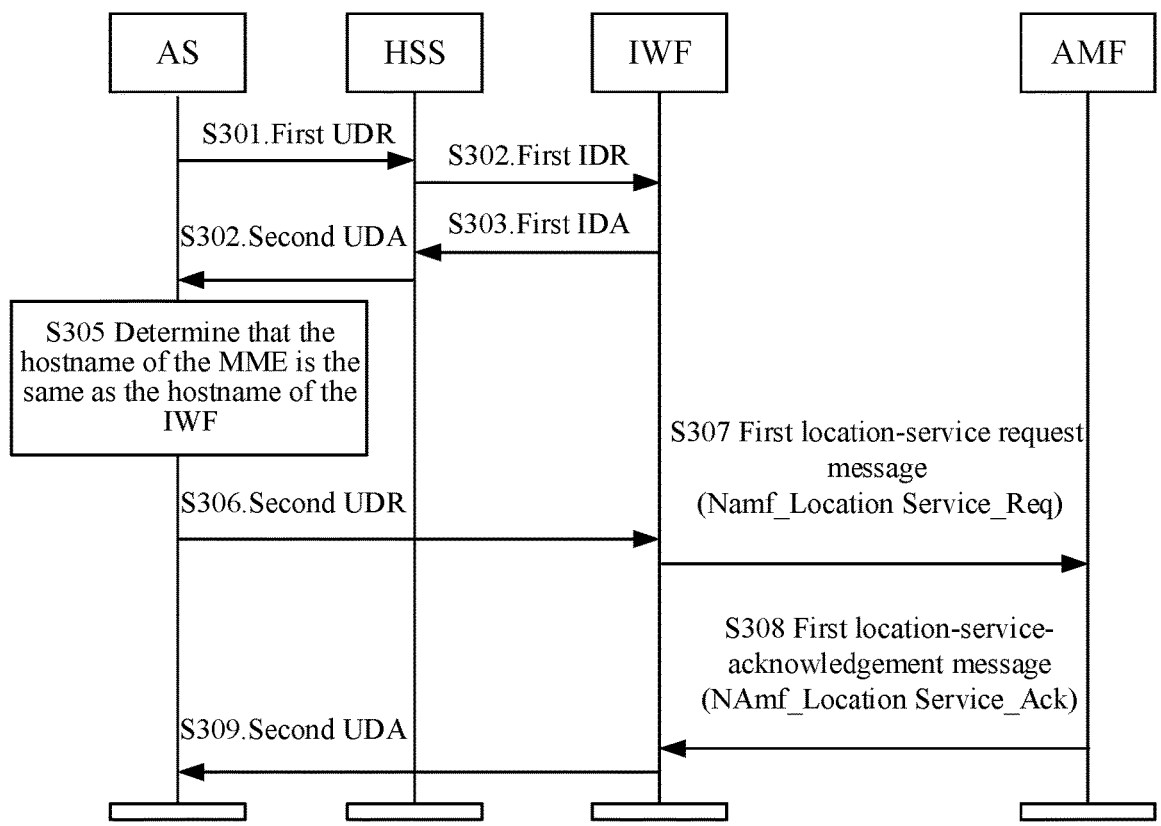
FIG. 3 is a schematic flowchart of how an AS acquires location information of a user in a 5G network according to an embodiment of the present disclosure.

In an application example, an AS sends a first user-data-request (UDR) message to an HSS, and the HSS feeds back a hostname of an MME currently registered for a user to the AS, and in a case where the AS determines that the hostname of the above MME is a hostname of an IWF, the AS sends a second UDR message to an IWF, where the second UDR message is used to instruct the IWF to query location information of the user in a 5G network. FIG. 3 is a schematic flowchart of how an AS acquires location information of a user in a 5G network according to an embodiment of the present disclosure. As shown in FIG. 3, How the AS acquires location information of the user in the 5G network according to the embodiment of the present disclosure mainly includes the following operations in S301, S302, S303, S304, S305, S306, S307, S308 and S309.

Operation in S301 includes that, AS sends a first UDR message to an HSS to query location information of the user.

Operation in S302 includes that, the HSS sends a first IDR message to an IWF to query location information of the user.

Operation in S303 includes that, the IWF feeds back a first IDA message with its own hostname carried therein to the HSS.

Also, the IWF sets the location information to be fed back as null, and has the location information carried in the first IDA message, and feeds back the first IDA message to the HSS.

Operation in S304 includes that, the HSS feeds back a first UDA message to the AS, where the first UDA message carries a hostname of an MME which is also a hostname of the IWF.

Operation in S305 includes that, the AS compares the hostname of the MME received from the HSS with the hostname of the IWF configured by the AS, and if the two are the same and other location information parameters are empty, the AS determines that the network registered for the user is a 5G network.

Operation in S306 includes that, the AS sends a second UDR message to the IWF, to query location information of the user in the 5G network.

Operation in S307 includes that, the IWF sends Namf_Location-service_Req to the AMF to query location information of the user.

Operation in S308 includes that, the AMF feeds back Namf_Location-service_Ack to the IWF, where the Namf_Location-service_Ack carries location information of the user in the 5G network.

Operation in S309 includes that, the IWF feeds back a second UDA to the AS, so as to feed back the location information of the user in the 5G network acquired from the AMF to the AS.

In an applicable example, a GMLC queries location information of a user from an HSS, the HSS feeds backs a hostname of an MME currently registered for the user to the GMLC, and the GMLC determines whether the hostname of the MME is a hostname of an IWF or not. In response to that the hostname of the MME is a hostname of an IWF, the GMLC queries for location information of the user in a 5G network from an IWF.

Figure 4:
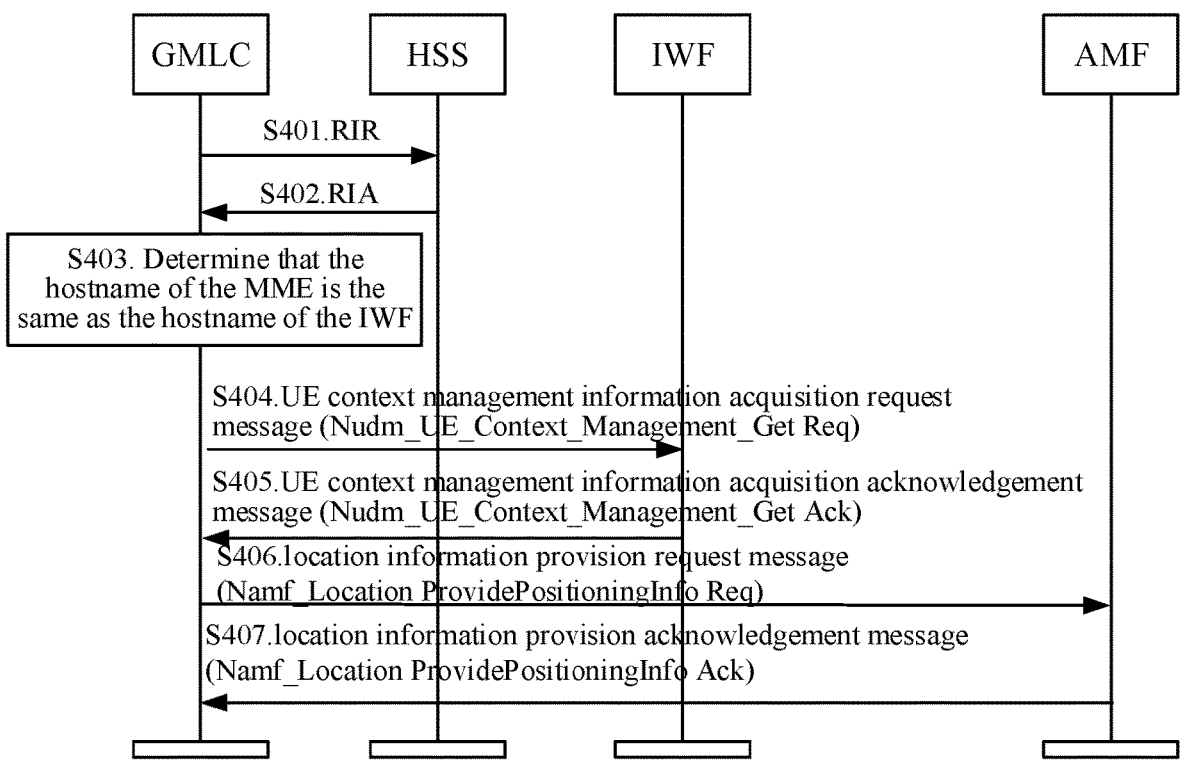
FIG. 4 is a schematic flowchart of how a GMLC acquires location information of a user in a 5G network according to an embodiment of the present disclosure.

FIG. 4 is a schematic flowchart of how a GMLC acquires location information of a user in a 5G network according to an embodiment of the present disclosure. As shown in FIG. 4, how the GMLC acquires location information of the user in the 5G network according to an embodiment of the present disclosure mainly includes the following operations in S401, S402, S403, S404, S405, S406 and S407.

Operation in S401 includes that, a GMLC sends a location-service routing-information-request (LCS-Routing-information-request, RIR) message to an HSS to query LCS routing information.

Operation in S402 includes that, the HSS feeds back a location-service routing-information-answer (LCS-Routing-information-answer, RIA) message, where the RIA message carries a hostname of an MME.

Operation in S403 includes that, the GMLC compares the hostname of the MME acquired from the HSS with a hostname of an IWF configured by the GMLC, and determines that the two are the same. Based on this, the GMLC determines that the network registered for the user is a 5G network.

Operation in S404 includes that, the GMLC sends a UE conext management information acquisition message (Nudm_UE_Context_Management_Get Req) to the IWF through a service interface to acquire an address of an AMF.

Operation in S405 includes that, the IWF feeds back a UE conext management information acquisition message (Nudm_UE_Context_Management_Get Ack) to the GMLC, where the Nudm_UE_Context_Management_Get Ack carries the address of the AMF.

Operation in S406 includes that, the GMLC sends a positioning information provision request message (Namf_Location ProvidePositioningInfo Req) to the AMF through a service interface, so as to query location information of the user in the 5G network.

Operation in S407 includes that, the AMF feeds back a positioning information provision acknowledgement message (Namf_Location ProvidePositioningInfo Ack) to the GMLC, where the Namf_Location ProvidePositioningInfo Ack carries the location information of the user in the 5G network.

Figure 5:
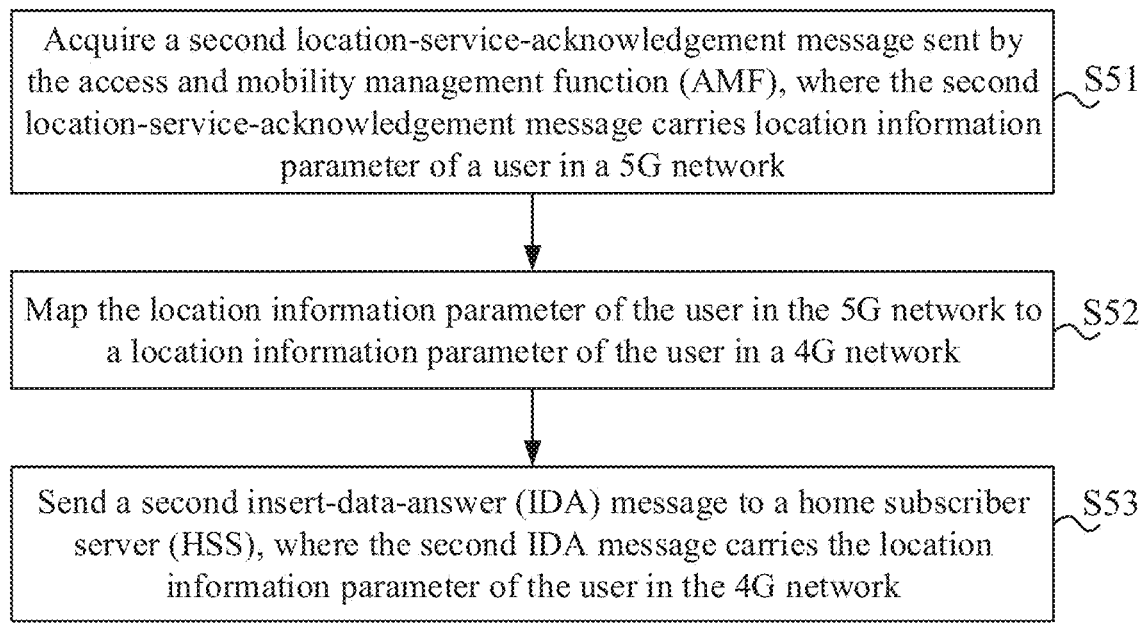
FIG. 5 is another schematic flowchart of a method for acquiring location information according to an embodiment of the present disclosure.

FIG. 5 is another schematic flowchart of a method for acquiring location information according to an embodiment of the present disclosure. This method may be applied to the case of acquiring, in a case where the user subscribed in 4G network accesses the 5G SA network, location information of the user in the 5G network. The method may be executed by an other location information acquisition apparatus according to the present disclosure, and the other location information acquisition apparatus may be implemented by software and/or hardware. The method is applied to an interworking function (IWF).

As shown in FIG. 5, the method for acquiring location information according to this embodiment of the present disclosure mainly includes operations in S51, S52 and S53.

Operation in S51 includes acquiring a second location-service-acknowledgement message sent by an access and mobility management function (AMF), where the second location-service-acknowledgement message carries a location information parameter of a user in a 5G network.

Operation in S52 includes mapping the location information parameter of the user in the 5G network to a location information parameter of the user in a 4G network.

Operation in S53 includes sending a second insert-data-answer (IDA) message to a home subscriber server (HSS), where the second IDA message carries the location information parameter in the 4G network.

In an exemplary embodiment, before acquiring the second location-service-acknowledgement message sent by the AMF, the method further includes: sending a second location-service-request message to the AMF, where the second location-service-request message is used to instruct the AMF to query location information of the user in the 5G network.

In an exemplary embodiment, before sending the second location-service-request message to the AMF, the method further includes: receiving a second insert-data-request (IDR) message sent by the HSS, where the second IDR message is used to instruct an IWF to send the second location-service-request message to the AMF, where the second DR message is determined according to a third UDR message sent by an application server (AS).

In an exemplary embodiment, the second IDA message is further used to instruct the HSS to send a third UDA message to the AS, where the third UDA message carries the location information parameter of the user in the 4G network.

In an application example, an AS queries location information of a user from an HSS, the HSS queries location information of the user from an IWF, the IWF acquires location information of the user in a 5G network from an AMF, the IWF performs the mapping of the location information in the 5G network to location information in a 4G network, and the IWF feeds back the mapped location information to the HSS. The HSS feeds back the location information to the AS.

Figure 6:
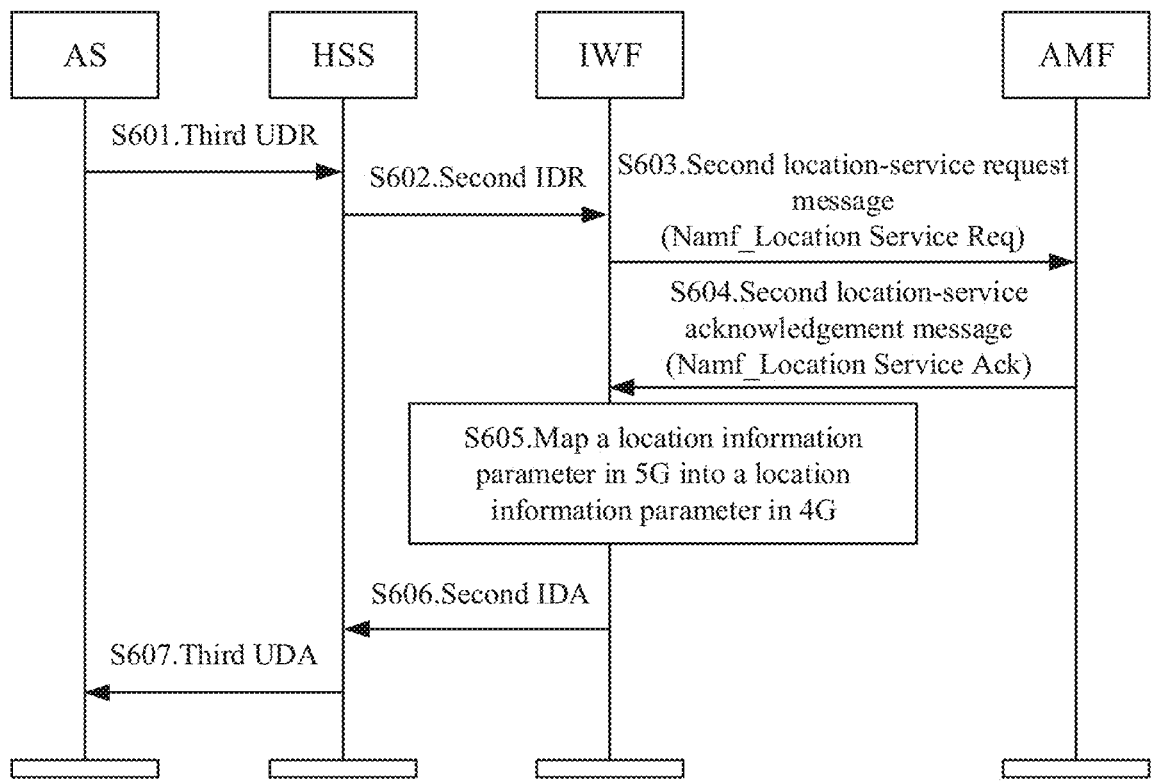
FIG. 6 is another schematic flowchart of how an AS acquires location information of a user in a 5G network according to an embodiment of the present disclosure.

FIG. 6 is another flow chart of acquiring, by an AS, location information of a user in a 5G network according to an embodiment of the present disclosure. As shown in FIG. 6, the method of acquiring location information of a user in a 5G network by an AS according to an embodiment of the present disclosure includes the following operations in S601, S602, S603, S604, S605, S606 and S607.

Operation in S601 includes that, an AS sends a third UDR message to an HSS to query location information of a user.

Operation in S602 includes that, the HSS sends a second IDR message to an IWF to query location information of the user.

Operation in S603 includes that, the IWF sends a second location-service request message (Namf_Location-service_Req) to an AMF to query location information of the user.

Operation in S604 includes that, the AMF feeds back a second location-service acknowledgement message (Namf_Location-service_Ack) to the IWF, where the Namf_Location-service_Ack carries location information of the user in a 5G network.

Operation in S605 includes that, the IWF maps a location information parameter of the user in the 5G network received from the AMF to a location information parameter of the user in a 4G network.

Operation in S606 includes that, the IWF feeds back a second IDA message with the mapped location information parameter carried therein, to the HSS.

Operation in S607 includes that, the HSS feeds back a third UDA message with the location information parameter carried therein to the AS.

Figure 7:
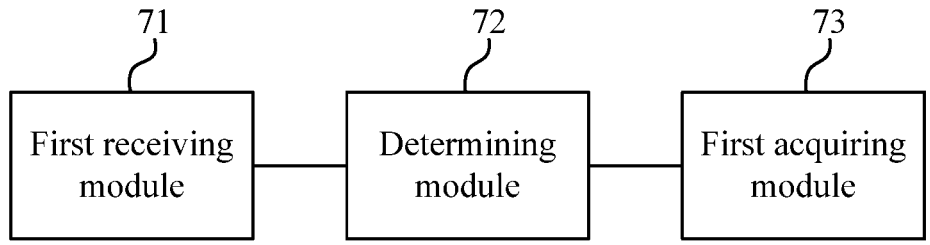
FIG. 7 is a schematic structural diagram of an apparatus for acquiring location information according to an embodiment of the present disclosure.

FIG. 7 is a schematic structural diagram of an apparatus for acquiring location information according to an embodiment of the present disclosure. The apparatus may be applied to a case of acquiring, in a case where a user in 4G accesses a 5G SA network, location information of the user in the 5G network. The apparatus for acquiring location information may be implemented by software and/or hardware. The apparatus for acquiring location information is configured in an AS and a GMLC.

As shown in FIG. 7, the apparatus for acquiring location information according to this embodiment of the present disclosure mainly includes a first receiving module 71, a determining module 72 and a first acquiring module 73.

The first receiving module 71 is configured to receive answer data sent by a home subscriber server (HSS), where the answer data carries a hostname of a mobility management entity (MME). The determining module 72 is configured to determine, on the basis of the hostname of the MME, a network actually registered for a user. The first acquiring module 73 is configured to acquire, in a case where the network actually registered for the user is a 5G network, location information of the user in the 5G network.

In an exemplary embodiment, the determining module 72 is configured to determine that the network actually registered for the user is a 5G network in a case where the hostname of the MME is the same as a pre-configured hostname of an IWF and other location information parameters in the answer data are empty.

In an exemplary embodiment, the first receiving module 71 is configured to receive, in a case where the first network element is an application server (AS), a first user-data-answer (UDA) message sent by the HSS, where the first UDA message carries the hostname of the MME.

In an embodiment, the apparatus for acquiring location information further includes: a first sending module configured to send a first user-data-request (UDR) message to the HSS, where the first UDR message is used to instruct the HSS to send a first insert-data-request (IDR) message to an interworking function (IWF), where the first IDR message is used to request location information from the IWF and instruct the IWF to send a first insert-data-answer (IDA) message to the HSS, and the first IDA message carries the hostname of the MME and empty location information.

In an embodiment, the first acquiring module 73 is configured to send, in a case where the first network element is an application server (AS), a second UDR message to the IWF, where the second UDR message is used to instruct the IWF to send a first location-service-request message to an access and mobility management function (AMF), where the first location-service-request message is used to instruct the AMF to query location information of the user in the 5G network and instruct the AMF to send a first location-service-acknowledgement message to the IWF, where the first location-service-acknowledgement message carries the location information of the user in the 5G network. The first receiving module 71 is further configured to receive the second UDA message sent by the IWF, where the second UDA message carries the location information of the user in the 5G network.

In an exemplary embodiment, the first receiving module 71 is configured to receive, in a case where the first network element is a gateway mobile location center (GMLC), a location-service routing-information-answer (RIA) message sent by the HSS.

In an embodiment, the first sending module is further configured to send a location-service routing-information-request (RIR) message to the HSS, where the RIR message is used to instruct the HSS to query location-service routing information and instruct the HSS to send the RIA message to the GMLC, where the RIA message carries the location-service routing information, and the location-service routing information includes the hostname of the MME.

In an embodiment, the first acquiring module 73 is configured to send, in a case where the first network element is a gateway mobile location center (GMLC), a location determination request message to an AMF through a service interface, where the location-positioning-request message is used to instruct the AMF to query location information of the user in the 5G network and instruct the AMF to send a location-positioning-acknowledgement message to the GMLC; and the first receiving module 71 is configured to receive a location-positioning-acknowledgement message sent by the AMF, where the location-positioning-acknowledgement message carries the location information of the user in the 5G network.

Figure 8:
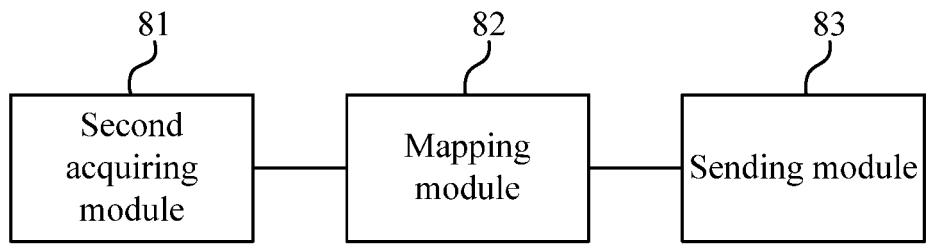
FIG. 8 is another schematic structural diagram of an apparatus for acquiring location information according to an embodiment of the present disclosure.

FIG. 8 is another schematic structural diagram of an apparatus for acquiring location information according to an embodiment of the present disclosure. The apparatus can be applied to the case of acquiring, in a case where a user in 4G network accesses a 5G SA network, location information of the user in the 5G network. The apparatus for acquiring location information may be implemented by software and/ or hardware. The apparatus for acquiring location information is applied to an interworking function (IWF).

As shown in FIG. 8, the apparatus for acquiring location information according to this embodiment of the present disclosure mainly includes a second acquiring module 81, a mapping module 82, and a sending module 83.

The second acquiring module 81 is configured to acquire a second location-service-acknowledgement message sent by an access and mobility management function (AMF), where the second location-service-acknowledgement message carries a location information parameter of a user in a 5G network. The mapping module 82 is configured to map the location information parameter of the user in the 5G network to a location information parameter of the user in a 4G network. The sending module 83 is configured to send a second insert-data-answer (IDA) message to a home subscriber server (HSS), where the second IDA message carries the location information parameter of the user in the 4G network.

In an exemplary embodiment, the sending module 83 is further configured to send a second location-service-request message to an AMF, where the second location-service-request message is used to instruct the AMF to query location information of the user in the 5G network.

In an exemplary embodiment, the second acquiring module 81 is further configured to receive a second insert-data-request (IDR) message sent by the HSS, where the second IDR message is used to instruct an IWF to send a second location-service-request message to an AMF, where the second IDR message is determined according to a third UDR message sent by an application server (AS).

In an exemplary embodiment, the second IDA message is further used to instruct the HSS to send a third UDA message to the AS, where the third UDA message carries the location information parameter of the user in the 4G network.

Figure 9:
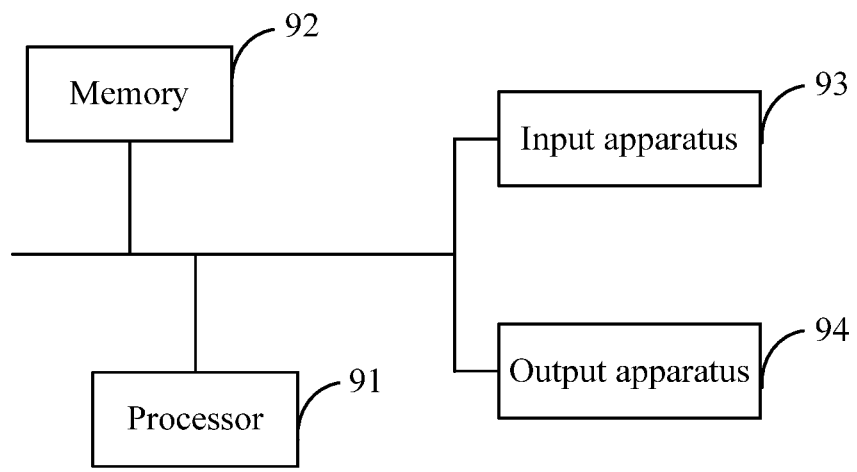
FIG. 9 is a schematic structural diagram of a device according to the present disclosure.

A device is further provided according to embodiments of the present disclosure. FIG. 9 is a schematic structural diagram of a device according to the present disclosure. As shown in FIG. 9, the device according to the present disclosure includes one or more processes 91 and a memory 92. The device may include one or more processors 91, and one processor 91 included is taken as an example in FIG. 9. The memory 92 is configured to store one or more programs. The one or more programs are executed by the one or more processors 91, to cause the one or more processors 91 to implement the method for acquiring location information as described in the embodiments of the present disclosure.

The device further includes an input apparatus 93, and an output apparatus 94.

The processor(s) 91, the memory 92, the input apparatus 93, and the output apparatus 94 in the device may be connected via a bus or other means, and in FIG. 9, connection via a bus is taken as an example.

The input apparatus 93 may be configured to receive input numeric or character information and to generate input of key-pressing signal related to user settings of the device and functional control of the device. The output apparatus 94 may include a display device such as a display screen.

As a computer-readable storage medium, the memory 92 may be configured to store a software program, a computer-executable program and a module, such as the program instructions/module (e.g., the first receiving module 71, the determining module 72 and the first acquiring module 73 in the apparatus for acquiring location information) corresponding to the method for acquiring location information in the embodiments of the present disclosure. The memory 92 may include a program storage area and a data storage area, where the program storage area may store an operating system and at least one application program required by functions, the data storage area may store data created during a utilization of the device, and etc. In addition, the memory 92 may include a high-speed random access memory, and may further include a non-volatile memory, such as at least one magnetic disk storage apparatus, a flash memory device, or other non-volatile solid-state storage apparatus. In some examples, the memory 92 may include memories which are remotely provided with respect to the processor(s) 91, and these remote memories may be connected to the device through a network. Examples of the aforementioned network include, but are not limited to, the Internet, an intranet, a local area network, a mobile communication network, or any combination thereof.

A storage medium is further provided according to embodiments of the present disclosure, which stores a computer program. The computer program, when being executed by the processor, implements the method for acquiring location information according to any one of the embodiments of the present disclosure.

From the above description of the embodiments, the person skilled in the art can understand that the present disclosure can be implemented by means of software and necessary general-purpose hardware, and can also be implemented by hardware. The present disclosure can be embodied in the form of a software product, and the computer software product can be stored in a computer-readable storage medium, such as a floppy disk of a computer, a read-only memory (ROM), a random access memory (RAM), a flash memory (FLASH), a hard disk or optical disk, etc., the computer software product includes multiple instructions to make a computer device (which may be a personal computer, a server, or a network device, etc.) execute the methods for acquiring location information described in the various embodiments of the present disclosure.

It should be noted that, in the embodiments of the apparatus for acquiring location information described above, the multiple units and modules included therein are only divided according to functional logic, but are not limited to the divisions described above, as long as the corresponding functions can be realized; in addition, the multiple functional units are only named for the convenience of distinguishing from each other, and are not intended to limit the protection scope of the present disclosure.

The above are only exemplary embodiments of the present disclosure, which are not intended to limit the scope of the present disclosure.

It is to be understood by the person skilled in the art that the term "user equipment (UE)" encompasses any appropriate type of radio user device, such as a mobile phone, a portable data processing apparatus, a portable web browser, or a vehicle-mounted mobile station.

Generally speaking, the various embodiments of the present disclosure may be implemented in hardware or a dedicated circuit, software, logic, or any combination thereof. For example, some aspects of the various embodiments may be implemented in hardware, while other aspects of the various embodiments may be implemented in firmware or software that may be executed by a controller, a microprocessor, or other computing apparatuses, and the present disclosure is not limited thereto.

Embodiments of the present disclosure may be implemented by a data processor of a mobile apparatus executing computer program instructions, for example, the embodiments of the present disclosure may be implemented in a processor entity, by hardware, or by a combination of software and hardware. The computer program instructions may be assembly instructions, instruction set architecture (ISA) instructions, machine instructions, machine-related instructions, micro-codes, firmware instructions, state setting data, or source codes or object codes written in any combination of one or more programming languages.

The block diagrams of any logic flow in drawings of the present disclosure may represent program steps, or may represent interconnected logic circuits, modules, and functions, or may represent a combination of program steps, logic circuits, modules, and functions. The computer programs may be stored in a memory. The memory may be of any type suitable for a local technical environment and may be implemented using any suitable data storage technology, such as, but not limited to, a read-only memory (ROM), a random-access memory (RAM) and an optical memory apparatus and system (digital video disc (DVD) or compact disc (CD)). The computer-readable storage medium may include a non-transitory storage medium. The data processor may be of any type appropriate for the local technical environment such as, but not limited to, a general-purpose computer, a special purpose computer, a microprocessor, a digital signal processor (DSP), an application specific integrated circuit (ASIC), a field-programmable gate array (FPGA), or a processor based on a multi-core processor architecture.

What is claimed is:

1. A method for acquiring location information, applied to a first network element, comprising:
   receiving answer data sent by a home subscriber server (HSS), wherein the answer data carries a hostname of a mobility management entity (MME);
   determining, on the basis of the hostname of the MME, a network actually registered for a user; and
   in a case where the network actually registered for the user, determined on the basis of the hostname of the MME, is the 5th generation mobile communication technology (5G) network, acquiring location information of the user in the 5G network;
   wherein determining, on the basis of the hostname of the MME, the network actually registered for the user comprises:
   determining that the network actually registered for the user is the 5G network in a case where the hostname of the MME is the same as a pre-configured hostname of an interworking function (IWF) and other location information parameters except the hostname of the MME in the answer data are empty.

2. The method according to claim 1, wherein in a case where the first network element is an application server (AS), the receiving answer data sent by a home subscriber server (HSS) comprises:
   receiving a first user-data-answer (UDA) message sent by the HSS, wherein the first UDA message carries the hostname of the MME.

3. The method according to claim 2, wherein before the receiving a first user-data-answer (UDA) message sent by the home subscriber server (HSS), the method further comprises:
   sending a first user-data-request (UDR) message to the HSS, wherein the first UDR message is used to instruct the HSS to send a first insert-data-request (IDR) message to an IWF, wherein the first IDR message is used to request location information from the IWF and instruct the IWF to send a first insert-data-answer (IDA) message to the HSS, and the first IDA message carries the hostname of the MME and empty location information.

4. The method according to claim 1, wherein in a case where the first network element is an application server (AS), the acquiring location information of the user in the 5G network comprises:
   sending a second UDR message to an IWF, wherein the second UDR message is used to instruct the IWF to send a first location-service-request message to an access and mobility management function (AMF), the first location-service-request message is used to instruct the AMF to query location information of the user in the 5G network and instruct the AMF to send a first location-service-acknowledgement message to the IWF, and the first location-service-acknowledgement message carries the location information of the user in the 5G network; and
   receiving a second UDA message sent by the IWF, wherein the second UDA message carries the location information of the user in the 5G network.

5. The method according to claim 1, wherein in a case where the first network element is a gateway mobile location center (GMLC), the receiving answer data sent by a home subscriber server (HSS) comprises:
   receiving a location-service routing-information-answer (RIA) message sent by the HSS.

6. The method according to claim 5, wherein before the receiving the location-service routing-information-answer (RIA) message sent by the HSS, the method further comprises:
   sending a location-service routing-information-request (RIR) message to the HSS, wherein the RIR message is used to instruct the HSS to query location-service routing information and instruct the HSS to send the RIA message to the GMLC, wherein the RIA message carries the location-service routing information, and the location-service routing information comprises the hostname of the MME.

7. The method according to claim 1, wherein in a case where the first network element is a GMLC, the acquiring location information of the user in the 5G network comprises:
- sending a location-information-provision-request message to an AMF through a service interface, wherein the location-information-provision-request message is used to instruct the AMF to query location information of the user in the 5G network and instruct the AMF to send a location-information-provision-acknowledgement message to the GMLC; and
- receiving a location-information-provision-acknowledgement message sent by the AMF, wherein the location-information-provision-acknowledgement message carries the location information of the user in the 5G network.

8. A device, comprising: at least one processor; and a memory, configured to store at least one program; wherein the at least one program, when being executed by the at least one processor, causes the at least one processor to
- receiving answer data sent by a home subscriber server (HSS), wherein the answer data carries a hostname of a mobility management entity (MME);
- determining, on the basis of the hostname of the MME, a network actually registered for a user; and
- in a case where the network actually registered for the user, determined on the basis of the hostname of the MME, is the 5th generation mobile communication technology (5G) network, acquiring location information of the user in the 5G network;
- wherein determining, on the basis of the hostname of the MME, the network actually registered for the user comprises:
- determining that the network actually registered for the user is the 5G network in a case where the hostname of the MME is the same as a pre-configured hostname of an interworking function (IWF) and other location information parameters except the hostname of the MME in the answer data are empty.

9. A non-transitory computer-readable storage medium, storing a computer program, wherein the computer program, when being executed by a processor,
- receiving answer data sent by a home subscriber server (HSS), wherein the answer data carries a hostname of a mobility management entity (MME);
- determining, on the basis of the hostname of the MME, a network actually registered for a user; and
- in a case where the network actually registered for the user, determined on the basis of the hostname of the MME, is the 5th generation mobile communication technology (5G) network, acquiring location information of the user in the 5G network;
- wherein determining, on the basis of the hostname of the MME, the network actually registered for the user comprises:
- determining that the network actually registered for the user is the 5G network in a case where the hostname of the MME is the same as a pre-configured hostname of an interworking function (IWF) and other location information parameters except the hostname of the MME in the answer data are empty.

* * * * *